United States Patent [19]

Collier

[11] 4,310,303
[45] Jan. 12, 1982

[54] PLUG-IN RECUPERATOR AND METHOD

[75] Inventor: David W. Collier, Cannock, England

[73] Assignee: W. B. Combustion, Inc., Hales Corners, Wis.

[21] Appl. No.: 168,810

[22] Filed: Jul. 11, 1980

[51] Int. Cl.³ .............................................. F27B 5/14
[52] U.S. Cl. ................................. 432/209; 126/91 A; 431/215
[58] Field of Search ............... 432/29, 209; 126/91 A; 431/215

[56] References Cited

U.S. PATENT DOCUMENTS 2,188,133  1/1940  Hepburn ........................... 431/215
4,140,482  2/1979  Simon ............................... 432/209

FOREIGN PATENT DOCUMENTS 52-57551  5/1977  Japan ................................ 432/209
580233   11/1955  U.S.S.R. ........................... 432/209

Primary Examiner—John J. Camby
Attorney, Agent, or Firm—Dressler, Goldsmith, Shore, Sutker & Milnamow, Ltd.

[57] ABSTRACT

An internal plug-in recuperator positioned within the exhaust assembly of a furnace for increasing the efficiency of a combustion furnace system by using less fuel input per heat output than conventional systems. Hot exhaust gases flowing within the exhaust assembly heat ambient air are directed through the recuperator before that air is injected into the burner. Preferably, the recuperator is constructed in a counterflow arrangement with an inner recuperator tube positioned within an outer recuperator tube.

3 Claims, 4 Drawing Figures

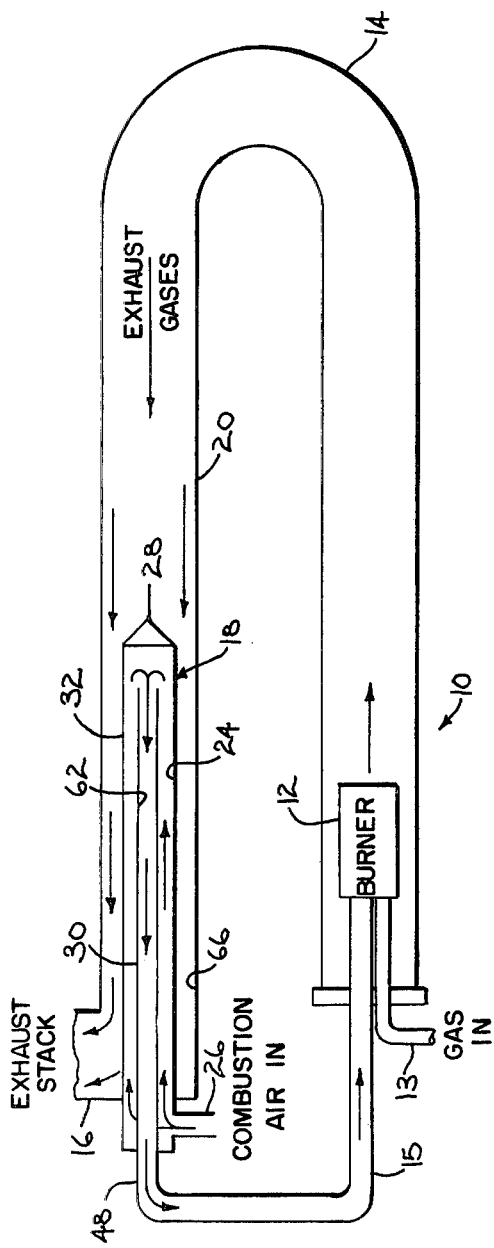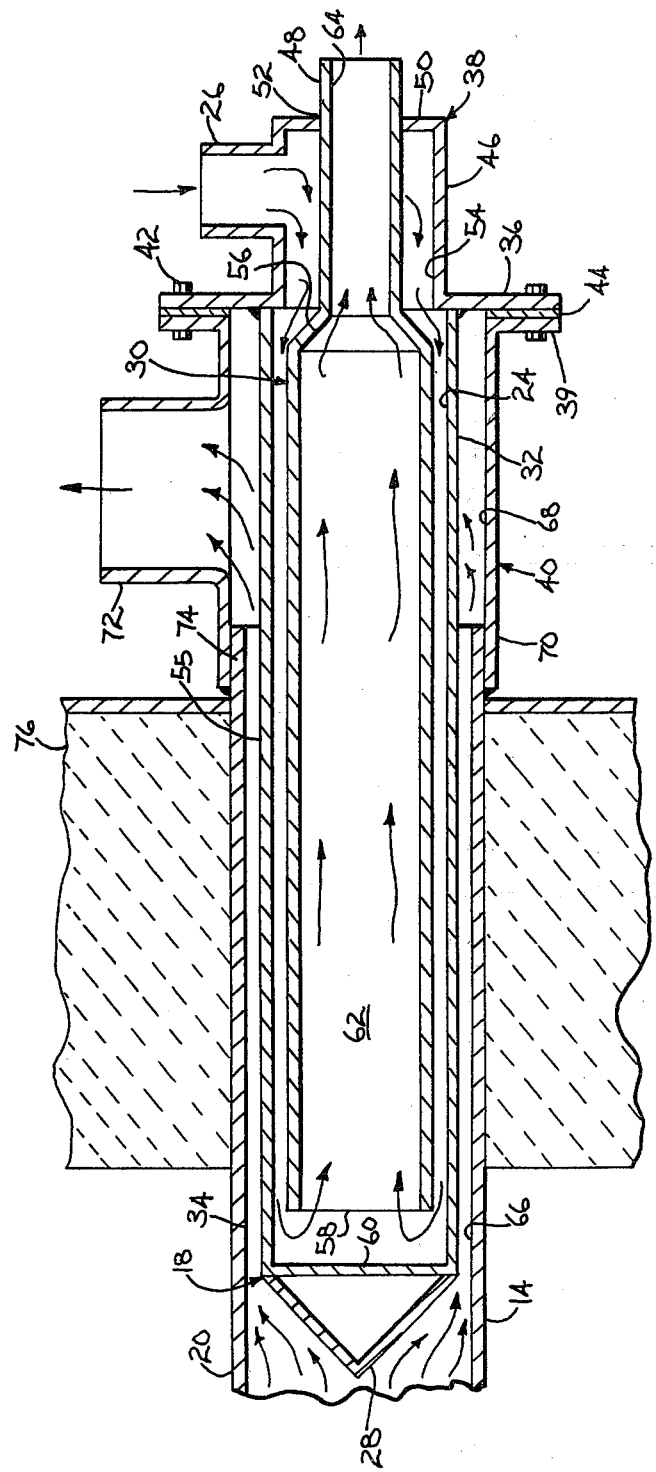

PLUG-IN RECUPERATOR AND METHOD

DESCRIPTION

1. Technical Field of the Invention

This invention relates to energy saving devices, and more particularly, to a recuperator and method for increasing the efficiency of furnaces so that gas input can be reduced while maintaining the same heat output.

2. Background of the Invention

In many gas fired furnaces as much as 60 percent of the heat supplied is wasted because it is discharged up the exhaust stack before it is circulated or otherwise utilized for its intended purpose. This is a great loss of energy which is even more aggravating with the present scarcity of fuel in many of the major industrial countries.

While various heat exchangers, recuperators and other devices have been suggested to utilize this wasted gas, most of these prior art devices are complex, expensive and require major alterations to existing furnaces. While recuperators located externally of the combustion system have also been used, external recuperators are usually bulky and occupy valuable storage space. Typifying some of the many conventional heat exchangers and other prior art devices are those shown in British Pat. Nos. 1,010,870, 1,301,669 and 1,492,520.

It is therefore desirable to provide an improved recuperator which overcomes most, if not all, of the preceding problems.

SUMMARY OF THE INVENTON

A plug-in type recuperator is provided to increase the overall efficiency of furnaces so that gas input can be reduced while maintaining the same heat output. The plug-in type recuperator is efficient, effective, easy to install and relatively inexpensive. The novel internal recuperator can be installed directly to the furnace without modifying the furnace's burner, exhaust stack, brickwork or piping and without substantial alterations to the furnace. The illustrated recuperator is particularly designed to plug into and fit within the exhaust leg of a furnace's U-type radiant tube.

The plug-in recuperator is constructed and arranged to provide a compact single pass counterflow, recuperating heat exchanger which relies primarily on radiation for heat transfer from the furnace's waste exhaust gases and on convection for heat transfer to the combustion air. Advantageously, the plug-in recuperator preheats the air in a novel manner to attain great energy savings.

The recuperator has an outer recuperator tube and an inner recuperator tube. In operation, exhaust gases flowing through the annular exhaust chamber between the outer recuperator tube and the exhaust tube heat ambient air flowing between the inner and outer recuperator tubes. The heated air is baffled into the inner recuperator tube where it is directed to the burner.

A more detailed explanation of the invention is provided in the following description and appended claims taken in conjunction with the accompanying drawings.

BRIEF DESCRIPTION OF THE DRAWINGS

FIG. 1 is a cross-sectional view of a plug-in recuperator in accordance with the principles of the present invention;

FIG. 2 is a schematic flow diagram of the plug-in recuperator positioned in the exhaust leg of a U-type radiant tube of a gas-fired furnace combustion system;

DETAILED DESCRIPTION OF THE PREFERRED EMBODIMENT

Figure 3:
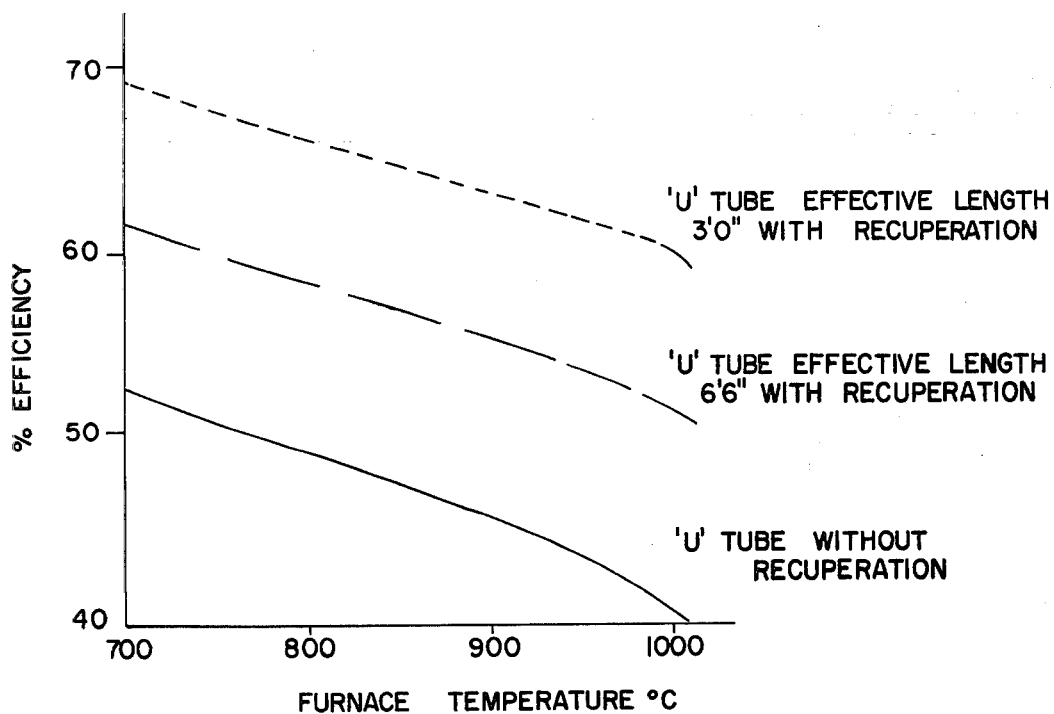
FIG. 3 is a graph illustrating the efficiency of positive pressure U-type radiant tubes fitted with the plug-in recuperator.

Referring now to the schematic flow diagram of FIG. 2, a gas fired combustion furnace system 10 has a positive pressure combustion flame burner 12 that receives gaseous fuel from gas inlet line 13 and preheated air from preheated air inlet line 15. The heat and hot exhaust gases generated and emitted by burner 12 is directed to a U-shaped radiant tube 14 to an upright exhaust stack 16 for discharge into the atmosphere.

In accordance with the invention, a plug-in type internal recuperator 18, sometimes referred to as a "plug recuperator" or "recuperator assembly" is plugged into and located within the exhaust leg 20 of the U-shaped radiant tube 14. Ambient air is fed into an annular outer chamber 24 of recuperator 18 via combustion air inlet 26. The ambient air is preheated in the outer chamber 24, as it moves towards the nose 28 of the recuperator, by heat transfer of the hot exhaust gases flowing in the opposite direction about the outer recuperator tube 32 of recuperator 18 towards exhaust stack 16. The heated air in the outer chamber 24 passes through an inner recuperator tube 30 where it continues to be heated by the heat generated by the hot exhaust gases counterflowing towards exhaust stack 16. The preheated air is discharged from the recuperator 18 via outlet 48 which is connected to the air inlet 16 of burner 12.

Very little of the heat generated by burner 12 is used to heat the large quantities of air required for combustion as in conventional systems, i.e., the ambient air in prior art systems often cool the burner flame. Preheating the air prior to combustion with the plug-in recuperator 18 increases the overall efficiency of the combustion system and enables the gas input to be reduced while maintaining the same heat output.

Referring now to FIGS. 1 and 2, the outer cylindrical recuperator tube or shell 32 is positioned concentrically and operatively within the tubular, circular cross-sectional exhaust leg of U-shaped radiant tube 14 so as to provide an annular exhaust gas passageway 66 therebetween. In the illustrative embodiment, outer recuperative tube 32 is welded or otherwise secured to an annular end plate or flange 36 (FIG. 1) of an air inlet assembly 38. End plate 36 is mounted to the annular end plate or flange 39 of an exhaust gas outlet assembly or exhaust elbow 40 by bolts 42 passing through aligned bolt-receiving apertures in end plates 36 and 38. A gasket 44 fluidly seals end plates 36 and 38.

Air inlet assembly 38 has an air inlet tube 26 which communicates with a housing 46 that extends outwardly from end plate 36. Air inlet 26 extends radially outward of housing 46 so that ambient air injected into inlet 26 travels generally at right angles to the preheated air being discharged through the inner recuperator tube's reduced diameter outlet 48. Air outlet tube 48 extends axially outward of outer recuperator tube 32 as well as the centrally apertured closure plate 50 of air inlet assembly 38. Air outlet tube 48 is supported by the walls of closure plate 50 defining the air outlet tube-receiving opening or aperture 52 so that the outlet tube 48 is positioned concentrically within housing 46. The space between the air outlet tube 48 and the inner wall surface of housing 46 defines an annular air inlet passageway or chamber 54 which communicates with the annular air chamber or passageway 24 extending axially between the inner and outer recuperative tubes 30 and 32, respectively.

Inner recuperator tube 30 is positioned concentrically and operatively within outer recuperator tube 32 to provide an annular air chamber 18 therebetween. In the illustrative embodiment, inner and outer recuperative tubes 30 and 32 have circular cross-sections. Inner recuperator tube 30 has a main body portion 55 circumferentially surrounded by outer recuperator tube 32 and connected to reduced diameter outlet 48 via a frustoconical tubing section 56. The front end 58 of inner recuperator tube 30 is spaced rearwardly of the front disc-like cover plate, baffle or deflector 60 closing the end of outer recuperator tube 32. In this manner, ambient air entering inlet tube 26 passes through annular passageways 54 and 24 until it is deflected off baffle 60 and directed into the inner central preheated-air flow passageway 62 of inner recuperator tube 30 where it is discharged through the reduced diameter air flow passageway 64 and outlet 48. The corner connecting the main body 55 of the outer recuperator tube 32 and baffle 60 can be beveled or slanted to enhance the baffling of the preheated air from outer annular chamber 24 into the inner air flow passageway 62 of inner recuperator tube 30.

An external conical-shaped hollow nose or baffle 28 is welded or otherwise secured to the end of recuperator tube 32 to direct hot exhaust gases flowing through the exhaust leg 20 of U-shaped radiant tube 14 through the annular exhaust gas chamber 66 located between the inner surface 34 of exhaust leg 20 and the external outer surface of outer recuperator tube 32 and then into the annular exhaust chamber or passageway 68 located between the inner surface of the main cylindrical tubular body 70 of exhaust elbow 40 and the external outer surface of outer recuperative tube 32 where the heated air is discharged radially outward at right angles through exhaust discharge outlet tube 72. The outlet end 74 of exhaust leg 20 is telescopically inserted into and welded or otherwise secured to the tubular body 70 of exhaust gas outlet assembly 40.

In the illustrative embodiment, the exhaust leg 20 of U-shaped radiant tube 14 is mounted in furnace brickwall 76. The distance that outer recuperator tube 32 protrudes past the brickwork face 76 should not be more than 60 percent or less than 45 percent of the inside diameter of the exhaust leg 20 for optimum performance.

The ratio of the inside diameter 34 of exhaust leg 20 to the outside diameter of outer recuperator tube 32 should be such that the area of the annular gap defining the annular exhaust chamber 66 should be not less than 25 percent and not more than 35 percent of the inside cross-sectional area of exhaust leg 20.

The ratio of the outside diameter of the inner recuperator tube to the inside diameter of the outer recuperator tube 32 should be such that the area of the annular gap defining the annular air chamber 24 should be not less than 18 percent and not more than 28 percent of the cross-sectional area of the outer recuperator tube 32.

Recuperator 18 not only receives heat by convection from the exhaust gases flowing through exhaust gas chambers 66 and 68, but also from radiation from these exhaust gases. There is also radiation from the radiant tube 14 itself onto recuperator 18. The high temperature of radiant tube 14 in the exhaust leg 20 results from radiation of the exhaust gases and from conduction from the heating chamber along radiant tube 14. This heat would normally be lost into the brickwork 76 and casing.

Recuperator 18 is manufactured using heat resisting alloy for all surfaces exposed to high temperature exhaust gases and can be used at furnace temperatures as high as 1150 degrees C. The outer and inner recuperator tubes 32 and 30 should be made of a thermally conductive metal or material having a melting temperature substantially greater than the temperature of the exhaust gases. For example, recuperator tubes 30 and 32 can be made of various grades of iron/nickel/chromium or iron/chromium/nickel stainless steel alloys. These alloys can be rolled to proper size and arc welded. Exhaust elbow assembly 40 and air inlet assembly 38 can be made of carbon steel. Other materials can be used.

Plug-in recuperator 18 can be used with combustion systems such as sealed quench furnaces, glass industry annealing furnaces, continuous gas carburising furnaces, pit carburizing furnaces and other furnaces.

The graph of FIG. 3 shows the efficiency of different U-shaped radiant tubes fitted with a plug-in recuperator at varying furnace temperatures and tube lengths at a dissipation rate of 50 btu/sq. in. in comparison with a standard U-shaped radiant tube with a positive pressure burner. It can be seen from the graph of FIG. 3 that the efficiency of a U-shaped radiant tube having an effective length of 6 ft. 6 in. with recuperation is increased from over 50 percent to over 60 percent at 700 degrees C. and from about 40 percent to over 50 percent at 1000 degrees C. A U-shaped radiant tube having an effective length of 3 feet with recuperation has an increased efficiency to almost 70 percent at 700 degrees C. and to over 60 percent at 1000 degrees C.

Figure 4:
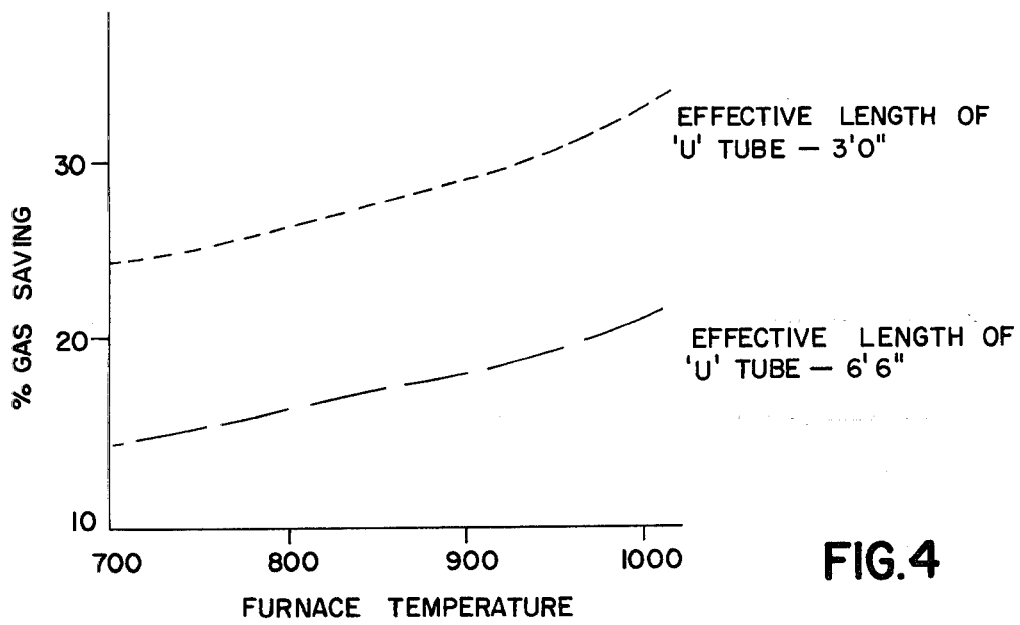
FIG. 4 is a graph illustrating the gas savings of the plug-in recuperator in positive pressure systems.

The graph in FIG. 4 illustrates gas savings of a plug-in recuperator on a positive pressure system. It can be seen from the graph of FIG. 4 that a U-shaped radiant tube having an effective length of 6 ft. 6 in. fitted with a plug-in recuperator will have a gas savings of about 14 percent at 700 degrees C. and about 20 percent at 1000 degrees C. A U-shaped radiant tube having an effective length of 3 feet fitted with a plug-in recuperator has a gas savings of about 24 percent at 700 degrees C. and about 32 percent at 1000 degrees C.

Plug-in recuperator 18 can be installed in a four tube furnace in about four hours. Plug-in recuperator 18 can be easily removed for inspection, maintenance, or replacement. In one installation, a sealed quench furnace with positive pressure burners using 512 cfh natural gas had its gas consumption reduced to 345 cfh after a plug-in recuperator was installed while maintaining a similar heat output.

Although an embodiment of the invention has been shown and described, it is to be understood that various modifications and substitutions can be performed by those skilled in the art without departing from the novel spirit and scope of this invention.

What is claimed is:

1. A radiant tube heater combustion system for a furnace, comprising:

A U-shaped radiant heating tube disposed within said furnace, and having a pair of legs, a burner disposed within one leg of said heating tube, the other leg of said heating tube being joined to exhaust means for receiving exhaust gases from said burner, fuel means for feeding fuel to said burner, a recuperator operatively positioned within said exhaust means, and extending into said other leg of said heating tube, air inlet means connected to said recuperator and detachably connected to said exhaust means, said recuperator including an outer recuperator tube spaced inwardly of and cooperating with said exhaust means and said other leg for defining an annular exhaust gas chamber therebetween;

said recuperator further including an inner recuperator tube spaced inwardly of and cooperating with said outer recuperator tube for defining an annular air chamber communicating with said air inlet means, and said inner recuperator tube defining an inner air flow passageway for directing heated air through air outlet means towards said burner, said outer recuperator tube including a baffle at one end for directing heated air from said annular air chamber to said inner air flow passageway, said annular exhaust gas chamber and said annular air chamber being positioned in counter-flow arrangement with each other so that air flowing through said annular air chamber travels in a direction generally opposite the flow of exhaust gases through said annular exhaust chamber, whereby air entering said air inlet means is heated in said recuperator by said exhaust gases in said annular exhaust chamber before being directed through said air outlet means to said burner.

2. A combustion system in accordance with claim 1, wherein said annular exhaust gas chamber has an area between about 25 percent and 35 percent of the cross-sectional area of said exhaust means.

3. A combustion system in accordance with claim 1 wherein said exhaust means is secured to brickwork and said outer recuperator tube extends outwardly of said brickwork a distance from about 45 percent to about 60 percent of the inside diameter of said exhaust means.

* * * * *